United States Patent
Ohkubo (10) Patent No.: US 7,566,523 B2
(45) Date of Patent: Jul. 28, 2009

(54) OPTICAL INFORMATION-RECORDING MEDIA AND OPTICAL INFORMATION-RECORDING/REPRODUCTION APPARATUS

(75) Inventor: Shuichi Ohkubo, Tokyo (JP)

(73) Assignee: NEC Corporation, Tokyo (JP)

( * ) Notice: Subject to any disclaimer, the term of this patent is extended or adjusted under 35 U.S.C. 154(b) by 485 days.

(21) Appl. No.: 10/781,999

(22) Filed: Feb. 19, 2004

(65) Prior Publication Data
US 2004/0166439 A1 Aug. 26, 2004

(30) Foreign Application Priority Data
Feb. 21, 2003 (JP) ............... 2003-044071

(51) Int. Cl.
G11B 7/24 (2006.01)
(52) U.S. Cl. ............. 430/270.13; 430/945; 428/64.5; 428/64.6; 369/275.2; 369/275.5
(58) Field of Classification Search ........... 430/270.13, 430/270.11, 945; 369/94, 286, 275.5, 283; 428/64.9, 64.5, 65.2, 64.6, 64.4
See application file for complete search history.

(56) References Cited

U.S. PATENT DOCUMENTS

| 5,789,055 | A | 8/1998 | Yoon | |
|---|---|---|---|---|
| 6,335,069 | B1 * | 1/2002 | Ogawa et al. | 428/64.1 |
| 2001/0036528 | A1 | 11/2001 | Abiko et al. | |
| 2002/0119278 | A1 * | 8/2002 | Bechevet et al. | 428/64.4 |
| 2002/0146643 | A1 | 10/2002 | Shingai | |

FOREIGN PATENT DOCUMENTS

| CN | 1320260 A | 10/2001 |
|---|---|---|
| EP | 1 172 811 A2 | 1/2002 |
| EP | 1 229 530 A2 | 8/2002 |
| JP | 01-180387 | 7/1989 |
| JP | 01180387 * | 7/1989 |
| JP | 02-064929 | 3/1990 |
| JP | 05-016528 | 1/1993 |
| JP | 07-104424 | 4/1995 |
| JP | 07-223372 | 8/1995 |
| JP | 11-126366 | 5/1999 |
| JP | 07-242970 | 9/2000 |
| JP | 2000-313170 | 11/2000 |

(Continued)

OTHER PUBLICATIONS

JPO website printout (8 pages).*
English language translation of JP-01180387.*

*Primary Examiner*—Mark F Huff
*Assistant Examiner*—Anna L Verderame
(74) *Attorney, Agent, or Firm*—Scully, Scott, Murphy & Presser, P.C.

(57) ABSTRACT

Optical information-recording media comprise a first transparent substrate through which a laser beam enters, a first information-recording layer deposited on the first transparent substrate, a first reflection film formed on the first information-recording layer, an intermediate layer deposited on the first reflection film, a second information-recording layer formed on the intermediate layer, a second reflection film deposited on the second information-recording layer, and a second substrate provided on the second reflection film. The recording film of each of the first and second information-recording layers has a main composition represented by $(GeTe)_x Sb_{2-y} In_y Te_3$, and its composition ratio is within ranges of $0.04 \leq y < 2$ and $4 \leq x \leq 8$.

6 Claims, 4 Drawing Sheets

FOREIGN PATENT DOCUMENTS

| | | | |
|---|---|---|---|
| JP | 2002-144736 | | 5/2002 |
| JP | 2002-211137 | * | 7/2002 |
| JP | 2002-230826 | | 8/2002 |
| JP | 2002-237095 | | 8/2002 |
| JP | 2002-264515 | | 9/2002 |
| JP | 2002-288876 | | 10/2002 |
| JP | 2002-293025 | | 10/2002 |
| JP | 2003-006860 | | 1/2003 |
| JP | 2003-045085 | | 2/2003 |
| WO | WO 01/13370 A1 | | 2/2001 |
| WO | WO 03/044786 | * | 10/2002 |

* cited by examiner

OPTICAL INFORMATION-RECORDING MEDIA AND OPTICAL INFORMATION-RECORDING/REPRODUCTION APPARATUS

BACKGROUND OF THE INVENTION

1. Field of the Invention

The present invention relates to optical information-recording media for which recording is performed by changing, through treating with a laser beam, the reflectivity or the optical phase of a recording film, and relates in particular to a phase-change optical disk. The present invention also relates to an optical information-recording/reproduction apparatus that employs optical information-recording media to record and reproduce pieces of optical information.

2. Related Background Art

To perform information recording and reproduction using a phase-change optical disk, a laser beam is used to treat a recording film, which produces reversible state changes between a crystal state and an amorphous state, and to change the reflectivity or the optical phase of the recording film. To prepare an optical disk for recording pieces of information, immediately after the optical disk has been manufactured, a recording film, which is in the amorphous state, is treated and crystallized with a laser beam (this step is called initialization). Then, the recording film is again treated with a laser beam and is returned to the amorphous state. Films of GeTe, SbTe, GeSbTe, InSbTe and AgInSbTe are typical, well-known recording films.

To increase the recording capacity of a phase-change optical disk, makers have employed a signal processing technique, a land groove recording technique, for recording pieces of information both in a guide groove used for tracking a substrate and in a flat portion defined between guide grooves, and a super resolution reproduction technique, for enabling the reproduction of a mark that is smaller than an optical diffraction limit. In addition to these techniques, a multi-layer disk, for which more recording faces are provided on the same laser incident face, is a preferred choice for increasing the recording capacity. Consequently, since the capacity of a double layer disk that has two recording film layers can be greatly increased, the development of the double layer disk has been actively studied.

Figure 2:
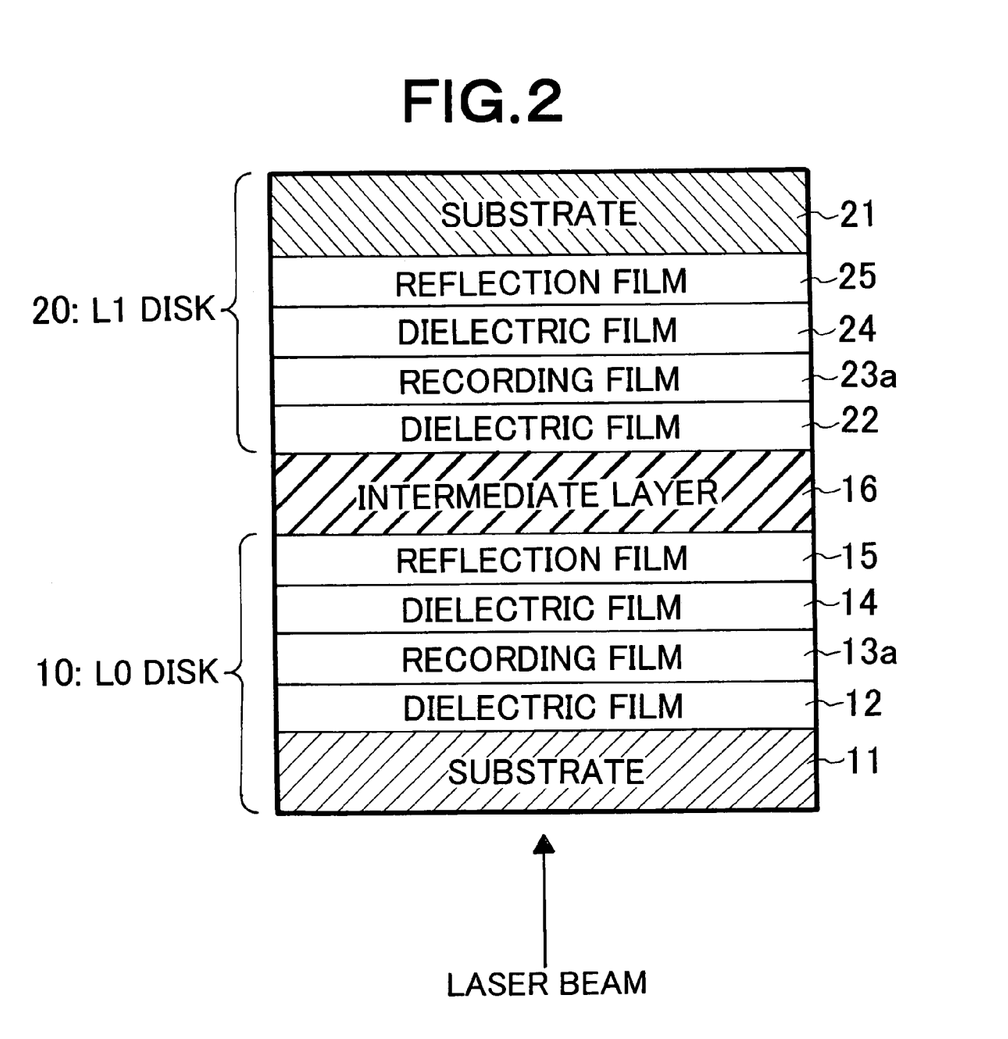
FIG. 2 is a cross-sectional view for explaining an example structure of a conventional optical information-recording medium.

When compared with a single layer disk, the recording capacity of a double layer disk may be increased about twice, at the maximum. Actually, for a DVD-ROM that employs a red semiconductor laser, single layer 4.7-GB disks and double layer 9-GB disks, which are nearly twice in capacity, are presently being sold on the market. For a double layer disk employing the same laser incident face, as is shown in FIG. 2, a disk near the laser incident face is defined as an L0 disk 10, and a disk farther from the laser incident face is defined as an L1 disk 20. In the following explanation, the L0 disk 10 and the L1 disk 20 are also referred to as layers L0 and L1. For these layers L0 and L1, dielectric films 12 and 22, recording films 13a and 23a, dielectric films 14 and 24 and reflection films 15 and 25 are deposited respectively on and under substrates 11 and 21. The layers 10 and 20 are coupled by bonding together the reflection film 15 of the layer L0 and the dielectric film 22 of the layer L1 via an intermediate layer 16. For the reproduction of a piece of information recorded on the layer L1, the layer L0 must have a specific transmission factor relative to a semiconductor laser that is used for information reproduction. Assuming that the transmission factor of the layer L0 is defined as T0 and the reflectivity of the layer L1 itself is defined as R1, the effective reflectivity of the layer L1 would be reduced to $T0^2 \times R1$ at the time of information reproduction for the L1 disk 20 of a double layer disk. Assuming that T0 is defined as 0.3 (30%), the effective reflectivity of the layer L1 would be lowered to 9% of the reflectivity of the L1 disk 20 itself.

In order to obtain an effective reflectivity for the L1 disk 20, the transmission factor of the L0 disk 10 must be about 0.5 (50%). If the transmission factor of the L0 disk 10 were too high, the reflectivity of the L0 disk 10 would be reduced and the quality of signals recorded on the L0 disk 10 would be deteriorated. Therefore, in order to obtain satisfactory characteristics for both the L0 disk 10 and the L1 disk 20, preferably, the transmission factor of the L0 disk 10 be about 0.5.

As a recording film consisting of an example combination of elements, an InGeSbTe recording film has been described for the purpose of increasing the number of rewriting operations in patent document 1 (Japanese Patent Laid-Open Publication No. Hei 7-223372). In this document, In is not added to displace Sb, but is added to displace a part of GeSbTe that is the parent composition, i.e., In is added in a style of $(GeSbTe)_{1-y}In_y$ (see patent document 1). Further, while in patent document 1 it is stated that a range of $0.03 \leq y \leq 0.3$ is appropriate, as will be described later, the recording characteristics can be remarkably improved by adding a smaller amount of In to displace part of Sb with In.

Since the recording films 13a and 23a used for the phase-change optical disk have a specific absorption factor relative to a laser beam emitted for information recording and reproduction, the thicknesses of the recording films 13 and 23a must be reduced in order to obtain a transmission factor of about 0.5. Generally, the thickness of a phase-change recording film used for a single layer optical disk is set within a range of from 13 to 25 nm. On the other hand, to obtain a transmission factor of about 0.5, conventionally, the thicknesses of the recording films 13a and 23a must be reduced to about 6 nm. However, when the thicknesses of the recording films are reduced to about 6 nm, the crystallization speed is lowered, giving rise to another problem, e.g., the erasing function is degraded, or the number of rewriting operations in which a piece of information can be rewritten is reduced.

Conventionally, when the thicknesses of the recording films are reduced, a surface layer made, for example, of GeN or SiN is additionally deposited between the recording film 13a or 23a and the dielectric layers 12 and 14 or 22 and 24 to prevent the deterioration of the erasing function. However, the addition of the surface layer complicates a disk manufacturing process, and increases disk-manufacturing costs.

SUMMARY OF THE INVENTION

It is, therefore, one objective of the present invention to provide an optical information-recording medium, which has no additional intermediate layer and has a specific transmission factor, superior erasing functions and repetitive rewriting operation characteristics ensured for a double layer disk. According to one aspect of the present invention, there is provided an optical information-recording medium for which recording is performed by irradiating a recording film with a laser beam to change the reflectivity or the optical phase of the recording film. $(GeTe)_xSb_{2-y}In_yTe_3$ is employed as the main composition for the recording film, and the composition ratio of the recording film is set so as to be within ranges of $0.04 \leq y < 2$ and $4 \leq x \leq 8$.

According to this aspect, the thickness of the recording film can be equal to or greater than 6 nm, and equal to or smaller than 13 nm. Further, an information-recording layer is formed such that the recording film is sandwiched between dielectric films on a transparent substrate. A reflection film is formed on the side of the information-recording layer opposite the light incident side. As a result, an optical information-recording medium having a single information-recording layer can be provided.

An optical information-recording medium having two information-recording layers is provided as follows. The double layer optical information-recording medium comprises:

a first transparent substrate through which a laser beam enters;

a first information-recording layer deposited on the first transparent substrate;

a first reflection film formed on the first information-recording layer;

an intermediate layer deposited on the first reflection film;

a second information-recording layer formed on the intermediate layer;

a second reflection film deposited on the second information-recording layer; and a second substrate provided on the second reflection film, wherein each of the first and the second information-recording layers is formed such that recording films are sandwiched between first and second dielectric layers, and wherein the recording film of each of the first and second information-recording layers has a main composition represented by $(GeTe)_x Sb_{2-y} In_y Te_3$, and its composition ratio is within ranges of $0.04 \leq y < 2$ and $4 \leq x \leq 8$.

For the optical information-recording medium of the invention, for example, a polycarbonate substrate or a glass substrate can be employed. Further, SiN, $SiO_2$, $TaO_x$, $Al_2O_3$, AlN or ZnS—$SiO_2$, or a lamination composed of these materials can be employed for the first and the second dielectric films, and an Ag or Au film around 10 nm thick can be employed as the reflection film.

To perform the recording and reproduction of pieces of optical information, an optical information-recording/reproduction apparatus according to the present invention emits a semiconductor laser beam having a wavelength of 400 to 430 nm to irradiate any of the optical information-recording media described above.

According to the present invention, an optical information-recording medium can be provided wherein, when the recording film is reduced in thickness, the specific transmission factor of the medium is ensured without an additional surface layer having to be formed, and the medium is superior both in erasing function and in number of rewriting repetitions. Especially when the recording film is only 8 nm thick, a transmission factor of at least 50% can be obtained. Furthermore, when the optical information-recording medium of the invention is employed, a high C/N value is obtained for the recording and reproduction of pieces of optical information using a semiconductor laser that produces a beam having a wavelength of 400 to 430 nm. In addition, when the optical information-recording medium of the invention is employed, the medium can be improved in cross-erasing characteristics, and can be increased in recording density.

DETAILED DESCRIPTION OF THE PREFERRED EMBODIMENT

Figure 1:
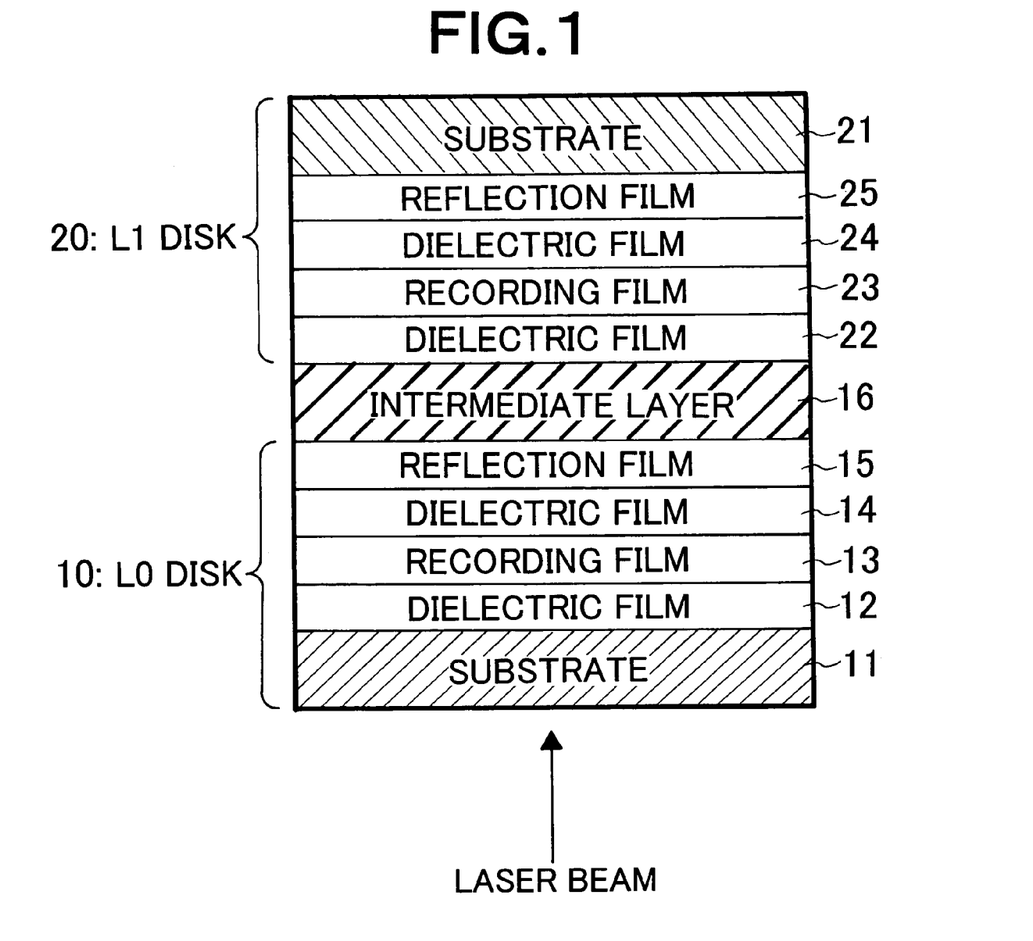
FIG. 1 is a cross-sectional view for explaining the structure of an optical information-recording medium according to one embodiment of the present invention.

FIG. 1 is a cross-sectional view of the structure of an optical information-recording medium according to the present invention. As is shown in FIG. 1, a double layer optical information-recording medium according to this invention comprises: a layer L0 (10), a layer L1 (20) and an intermediate layer 16 used for bonding the layers L0 and L1. For this invention, while only the layer L0 can serve as an optical information-recording medium of a single layer type, in the following explanation, an optical recording medium of a double layer type is mainly employed.

A polycarbonate (PC) substrate or a glass substrate can be employed as substrates 11 and 21. A guide groove used for tracking by a laser beam emitted to record and reproduce pieces of information is generally formed in the substrates 11 and 21. The L0 disk 10 is designed by sequentially laminating a dielectric film 0.12, a recording film 13, a dielectric film 14 and a reflection film 15 on the substrate 11.

A film of SiN, $SiO_2$, $TaO_x$, $Al_2O_3$, AlN or ZnS—$SiO_2$ or a laminated film of them can be employed for the dielectric films 12 and 14, and a film whose main composition $(GeTe)_x Sb_{2-y} In_y Te_3$ is employed for the recording film 13. The preferable concentration of the composition $(GeTe)_x Sb_{2-y} In_y Te_3$ is more than 95%, and the certain elements such as Ge, Sb, Te, Cr, Co, Ag, Si and so on can be added for improving durability. Since a specific transmission factor is required for the reflection film 15 of the L0 disk 10, a 10-nm thick Ag or Au film is generally employed. In order to improve the mechanical characteristics and the durability of the disk, as needed, a dielectric film may be additionally deposited on the reflection film 15.

Since only one laser beam incident face is provided for a double layer disk, the L1 disk 20 is designed by sequentially laminating a reflection film 25, a dielectric film 24, a recording film 23 and a dielectric film 22 on the substrate 21. The same materials as those used for the L0 disk 10 can be employed for the dielectric films 22 and 24 and the recording film 23 deposited on the L1 disk 20.

Since a specific transmission factor is not required for the reflection film 25 of the L1 disk 20, a metal film having a thickness of about 100 nm, which contains Al, Ag or Au as a primary component and which is frequently used for a common optical information-recording medium, such as a DVD-RAM or a DVD-RW, need only be employed.

After the L0 disk 10 and the L1 disk 20 have been manufactured using a sputtering method, the intermediate layer 16 is formed using a ultraviolet curing resin or a transparent tape, and both disks 10 and 11 are bonded to this intermediate layer 16. In this fashion, a double layer disk is completed. The intermediate layer 16 also serves as a barrier for preventing data recorded on the L0 disk 10 from interfering as noises during the reproduction process performed for the L1 disk 20, and preventing data recorded on the L1 disk 20 from interfering as noises during the reproduction process performed for the L0 disk 10.

The optical information-recording medium of the invention provides remarkable effects, especially for the recording and reproduction of pieces of optical information using a semiconductor layer with a wavelength of 400 to 430 nm.

Figure 3:
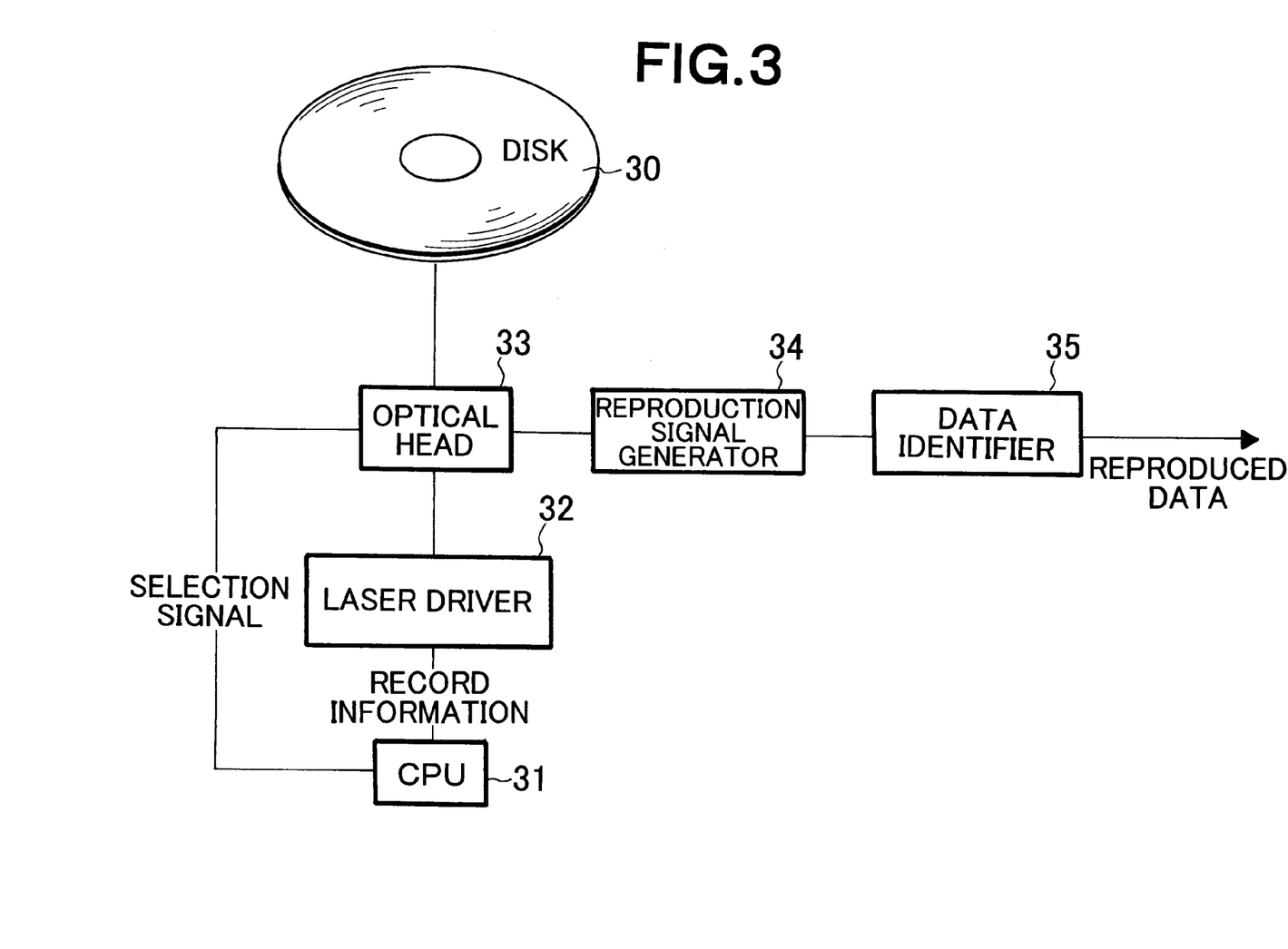
FIG. 3 is a diagram showing an example structure for an optical information-recording apparatus according to the present invention.

An example structure for an optical information-recording/reproduction apparatus according to the present invention is shown in FIG. 3. A piece of information (recording information) to be recorded on a disk 30 is transmitted from a CPU 31 to a laser driver 32, and the power and the pulse width of a laser beam used for recording are controlled by the laser driver 32 in accordance with the recording information. Further, a selection signal for indicating which of the two layers is used for recording is supplied by the CPU 31, and in accordance with the selection signal; the focusing position for an optical head 33 is changed between the layers. A piece of information supplied by the optical head 33 is employed as a piece of reproduction data using a reproduction signal generator 34 and a data identifier 35.

First Embodiment

L0 disks having different compositions for recording films 13 (x and y were changed in $(GeTe)_xSb_{2-y}In_yTe_3$) were manufactured using 0.6-mm thick PC substrates 11, while each of the recording films 13 was 8 nm in thickness. The recording and reproduction evaluation was performed for these L0 disks. The transmission factor of each disk was equal to or greater than 0.5 (50%), and according to the optical information-recording medium of the invention, a satisfactory transmission factor can be obtained even with an 8-nm thick recording film. Substrates in which guide grooves were formed at a pitch of 0.45 μm and a depth of 25 nm were employed as the PC substrates 11, and pieces of information were recorded inside the guide grooves. For each L0 disk, $ZnS$—$SiO_2$ was employed for the dielectric films 12 and 14, and a 10-nm thick Ag film was employed for the reflection film 15.

While the L0 disks were rotated at a linear speed of 5.6 m/s, 8T signals were overwritten with 3T marks at a clock frequency of 60 MHz (T=15.15 ns), and the erasing rates for the 8T signals were measured for the individual disks. For recording and reproduction, an optical head was employed that had a wavelength of 405 nm and an object lens with a numerical aperture (NA) of 0.65. The relationships between the compositions of the recording films and the erasing rates are shown in Table 1.

TABLE 1

| (x, y) | 8T erasing rate (dB) |
|---|---|
| (4, 0.02) | 20 |
| (4, 0.04) | 26 |
| (4, 0.1) | 30 |
| (4, 0.2) | 28 |
| (4, 0.3) | 26 |
| (8, 0.02) | 19 |
| (8, 0.04) | 25 |
| (8, 0.1) | 30 |
| (8, 0.2) | 29 |
| (8, 0.3) | 26 |

As is apparent from Table 1, when $0.04 \leq y$ within the range represented by $4 \leq x \leq 8$, a high erasing rate (equal to or higher than 25 dB) can be obtained, even for a thin, i.e., 8-nm recording film.

Second Embodiment

In this embodiment, while each of recording films 13 was 8 nm thick, L0 disks for which different compositions were used for the recording films 13 (x and y were changed in $(GeTe)_xSb_{2-y}In_yTe_3$) were manufactured by using the same PC substrates 11 as were in the first embodiment. Then, the recording and reproduction evaluation was performed for these L0 disks. While the L0 disks were rotated at a linear speed of 5.6 m/s, 8T signals were recorded at a clock frequency of 60 MHz (T=15.15 ns), and the C/N values were measured for these 8T signals.

For recording and reproduction, an optical head was employed that had a wavelength of 405 nm and an object lens with a numerical aperture (NA) of 0.65. The relationships between the compositions of the recording films 13, the C/N values and the recording laser power are

TABLE 2

| (x, y) | 8T C/N (dB) | Recording laser power (mW) |
|---|---|---|
| (3.5, 0.1) | 50 | 5 |
| (4, 0.1) | 54 | 5.3 |
| (6, 0.1) | 56 | 5.8 |
| (8, 0.1) | 57 | 6 |
| (8.5, 0.1) | 57 | 7 |

As is apparent from Table 2, high C/N values are obtained when $x \geq 4$. However, as x is increased, the laser power required for recording is also increased, and is sharply increased especially at x>8. Since a high recording power increases the load imposed on laser, and accelerates the deterioration of the quality of the laser, a low recording power is preferred. The range represented by $4 \leq x \leq 8$ is appropriate for the composition employed for the recording film 13.

It is apparent from the first and second embodiments that the composition ranges for obtaining a high erasing rate and a high C/N value (without an accompanying drastic increase in the recording power) are $4 \leq x \leq 8$ and $0.04 \leq y < 2$ in $(GeTe)_xSb_{2-y}In_yTe_3$.

For the disks that contain recording films 13 that satisfy (x, y)=(3.5, 0.1) and (4, 0.1) in Table 2, the C/N values were evaluated after the recording had been performed using a red semiconductor layer with a wavelength of 660 nm. For such disks, there was almost no difference in C/N value. Therefore, a blue-violet semiconductor laser (having a wavelength of 400 to 430 nm) is used to show that the value of x was changed to provide a remarkable improvement in C/N value.

[First Comparison Example]

The same PC substrates as in the first embodiment and recording films 13 (y in $(Ge_6Sb_2Te_9)_{1-y}In_y$ was changed) that were different in composition and thickness were used to manufacture L0 disks, and the recording and reproduction evaluation was performed for the L0 disks. For each L0 disk, $ZnS$—$SiO_2$ was employed for dielectric films 12 and 14, and an Ag film of 10 nm was employed as a reflection film 15.

In this comparison example, $Ge_6Sb_2Te_9$ that is the parent composition before In is added corresponds to the case of the invention where x=6. While the L0 disks were rotated at a linear speed of 5.6 m/s, 8T signals were overwritten with 3T marks at a clock frequency of 60 MHz (T=15.15 ns), and the erasing rates for the 8T signals were measured. For the recording and reproduction, an optical head was employed that had a wavelength of 405 nm and an object lens with a numerical aperture (NA) of 0.65. The relationships between the compositions of the recording films 13 and the transmission factors are shown in Table 3. From Table 3, it is found that when In is added in a displacement manner for one part of GeSbTe, a reduction in the erasing rate can not be avoided when a thin recording film is employed.

TABLE 3

| y | Thickness of a recording film (nm) | 8T erasing rate (dB) | Transmission factor (%) |
|---|---|---|---|
| 0.1 | 12 | 30 | 30 |
| 0.1 | 10 | 26 | 40 |
| 0.1 | 8 | 20 | 49 |
| 0.03 | 8 | 18 | 48 |
| 0.15 | 8 | 18 | 50 |

Third Embodiment

In this embodiment, disks were manufactured by using PC substrates 11 with a thickness of 0.6 mm and recording films that are different in thickness, and the recording and reproduction evaluation was performed. For the composition of the recording film 13, x=6 and y=0.1 in $(GeTe)_xSb_{2-y}In_yTe_3$ were employed. For each disk, ZnS—$SiO_2$ (12), the recording film 13, ZnS—$SiO_2$ (14) and an Ag reflection film 15 were sequentially laminated on the PC substrate 11. Substrates in which guide grooves were formed at a pitch of 0.68 μm and a depth of 45 nm were employed as the PC substrates 11, and recording (land groove recording) was performed inside the guide grooves and on the flat portions formed between the guide grooves. While a disk was rotated at a linear speed of 5.6 m/s, 8T signals were overwritten with 3T marks at a clock frequency of 60 MHz (T=15.15 ns), and the 8T signal-erasing rate was measured.

Further, for another track, an 8T signal was repetitively overwritten 10000 times, and the C/N value of the 8T signal was measured. Furthermore, for an additional track, a 3T signal was recorded inside the guide groove, and the carrier (C0) of the 3T signal was measured. Thereafter, an 8T signal was overwritten on an adjacent land (flat portion defined between the guide grooves) 100 times, and the carrier (C1) of the 3T signal was measured again for the guide groove. In this manner, the cross-erasing value (C1−C0) was measured.

For recording and reproduction, an optical head was employed that had a wavelength of 405 nm and an object lens with a numerical aperture (NA) of 0.65. The relationships between the thickness of a recording film, the erasing rate, the C/N value and the cross-erasing value are shown in Table 4. Since the erasing rate and the repetition characteristics (C/N values of the 8T signal after being overwritten 10000 times) are greatly degraded when the thickness of the recording film is reduced to 5 nm, it is preferred that the thickness of the recording film be equal to or greater than 6 nm. Further, according to the invention, since the repetition characteristics are deteriorated when the thickness of the recording film is increased to 15 nm, it is apparent from Table 4 that an appropriate range for the thickness of the recording film is from equal to or greater than 6 nm to equal to or smaller than 13 nm.

TABLE 4

| Thickness of a recording film (nm) | Erasing rate (dB) | 8T C/N (dB) | Cross erasing (dB) |
|---|---|---|---|
| 5 | 22 | 45 | 0 |
| 6 | 26 | 54 | 0 |
| 10 | 30 | 55 | 0 |
| 13 | 30 | 55 | 0 |
| 13 ($Ge_6Sb_2Te_9$: without In being added) | 30 | 55 | −2 |
| 15 | 26 | 48 | 0 |

It is also apparent from Table 4 that the recording film of the invention has excellent cross-erasing characteristics. Therefore, the recording film of the invention is appropriate not only for an L0 double layer optical disk, but also for a conventional single layer optical information-recording medium. That is, the recording film can remarkably be increased in recording density because of the superior cross-erasing characteristics of the recording film.

Figure 4:
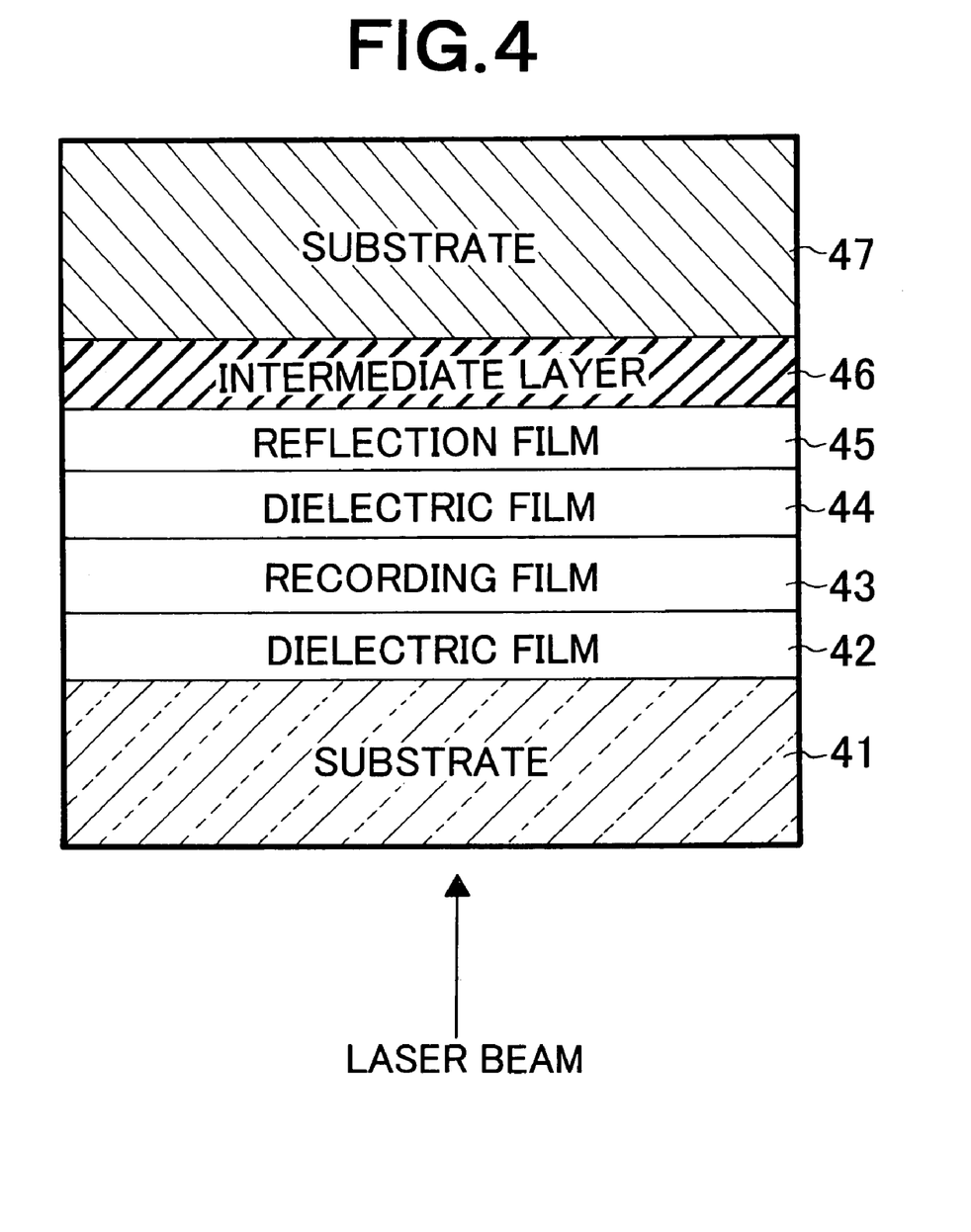
FIG. 4 is a diagram showing an example structure for an optical information-recording medium of a single layer type.

An example structure for a single layer optical information-recording medium is shown in FIG. 4. The optical information-recording medium in FIG. 4 comprises: a transparent substrate 41 through which a laser beam enters, and an information-recording layer formed on the transparent substrate 41. The information-recording layer includes: a first dielectric film 42, deposited on the transparent substrate 41; a recording film 43, formed on the first dielectric film 42; and a second dielectric film 44, formed on the recording film 43, and in addition, a reflection film 45 that is deposited on the second dielectric film 44. The composition of the recording film 43 is represented by $(GeTe)_xSb_{2-y}In_yTe_3$, and the composition ratio is within ranges represented by $0.04 \leq y < 2$ and $4 \leq x \leq 8$. When a 0.6-mm thick substrate is employed, generally, as is shown in FIG. 4, the substrate 41 is bonded, via an intermediate layer 46 made of an ultraviolet curing resin or a transparent tape, to a substrate 47 on which an information-recording layer is not formed.

When the recording film of the invention is employed for a double layer disk, only a recording film of the present invention having a thickness of about 8 nm need be employed for an L0 disk for which a specific transmission factor is required, while only a recording film of the present invention having a thickness of about 12 nm need be employed for an L1 disk for which the transmission factor is not especially restricted. Then, a double layer disk that has superior repetition characteristics and enables a high density recording operation can be easily provided. Since the erasing rate for the recording film of the invention depends only a little on film thickness, recording films having the same composition can be employed and only the films need be changed in thickness, so that the L0 and L1 disks can be manufactured.

Fourth Embodiment

In order to examine in detail the effects on the cross-erasing reduction due to the addition of In, the same measurement was conducted as that which was performed in the third embodiment. The substrate, the protection films and the reflection film that were employed for this measurement were the same as those used in the third embodiment. While each of the recording films was 12 nm thick, the composition of $(GeTe)_6Sb_{2-y}In_yTe_3$ was changed within a range represented by y=0.02 to 0.3. The results obtained when the cross erasing value was measured in the same manner as in the third embodiment are shown in Table 5.

TABLE 5

| y | Cross erasing (dB) |
|---|---|
| 0.02 | −2 |
| 0.04 | −0.3 |
| 0.1 | 0 |
| 0.2 | 0 |
| 0.3 | 0 |

As is apparent from Table 5, the cross erasing value can be greatly reduced by adding a predetermined amount of In as a displacement substance for Sb (specially, $y \geq 0.04$).

According to the above embodiment of the invention, a substrate (transparent layer) having a thickness of 0.6 mm was employed for the optical information-recording medium of the invention. However, the optical information-recording medium of the invention can also be employed for a disk that employs a transparent layer having a various value of thickness, e.g., a thickness of 0.1 mm. The optical information-recording medium of the invention used for a double layer disk has a superior erasing function and repetition characteristics, while ensuring a specific transmission factor. The utility value of this recording medium is extremely large.

What is claimed is:

1. An optical information-recording medium, for which recording is performed by irradiating a recording film with a laser beam to change the reflectivity or the optical phase of the recording film, comprising:
   a first transparent substrate through which the laser beam enters;
   a first information-recording layer deposited on the first transparent substrate;
   a first reflection film formed on the first information-recording layer;
   an intermediate layer deposited on the first reflection film;
   a second information-recording layer formed on the intermediate layer;
   a second reflection film deposited on the second information-recording layer; and
   a second substrate provided on the second reflection film,
   wherein each of the first and the second information-recording layers is formed such that recording films are sandwiched between first and second dielectric layers, and
   wherein the recording film of each of the first and second information-recording layers has a main composition represented by $(GeTe)_x Sb_{2-y} In_y Te_3$, and its composition ratio is within ranges of $0.04 \leq y \leq 0.3$ and $4 \leq x \leq 8$, and
   wherein the thickness of the recording film of each of the first and second information-recording layers is equal to or greater than 6 nm, and equal to or smaller than 13 nm.

2. An optical information-recording medium according to claim 1, wherein the first reflection film has a thickness of about 10 nm.

3. An optical information-recording medium, for which recording is performed by irradiating a recording film with a laser beam to change the reflectivity or the optical phase of the recording film, comprising:
   a transparent substrate though which the laser beam enters;
   an information-recording layer, being formed on the transparent substrate and including a first dielectric film deposited on the transparent substrate, a recording film deposited on the first dielectric film, and a second dielectric film deposited on the recording film; and
   a reflection film formed on the second dielectric film,
   wherein the recording film has a main composition represented by $(GeTe)_x Sb_{2-y} In_y Te_3$, and its composition ratio is within ranges of $0.04 \leq y \leq 2$ and $4 \leq x \leq 8$, and
   wherein the thickness of the recording film is equal to or greater than 6 nm, and equal to or smaller than 13 nm.

4. An optical information-recording/reproduction apparatus comprising:
   an optical information-recording medium;
   an optical head for irradiating the optical information-recording medium with a laser beam; and
   a drive mechanism for driving the optical head to irradiate, with the laser beam, a desired position on the optical information-recording medium,
   wherein the optical information-recording medium comprises:
      a first transparent substrate through which the laser beam enters,
      a first information-recording layer deposited on the first transparent substrate,
      a first reflection film formed on the first information-recording layer,
      an intermediate layer deposited on the first reflection film,
      a second information-recording layer formed on the intermediate layer,
      a second reflection film deposited on the second information-recording layer, and
      a second substrate provided on the second reflection film,
   wherein each of the first and the second information-recording layers is formed such that recording films are sandwiched between first and second dielectric layers, and
   wherein the recording film of each of the first and second information-recording layers has a main composition represented by $(GeTe)_x Sb_{2-y} In_y Te_3$, and its composition ratio is within ranges of $0.04 \leq y \leq 2$ and $4 \leq x \leq 8$, and
   wherein the thickness of the recording film of each of the first and second information-recording layers is equal to or greater than 6 nm, and equal to or smaller than 13 nm.

5. An optical information-recording/reproduction apparatus according to claim 4, wherein the first reflection film has a thickness of about 10 nm.

6. An optical information-recording/reproduction apparatus comprising:
   an optical information-recording medium;
   an optical head for irradiating the optical information-recording medium with a laser beam; and
   a drive mechanism for driving the optical head to irradiate, with the laser beam, a desired position on the optical information-recording medium,
   wherein the optical information-recording medium comprises:
      a transparent substrate through which the laser beam enters,
      an information-recording layer, being formed on the transparent substrate and including a first dielectric film deposited on the transparent substrate, a recording film deposited on the first dielectric film, and a second dielectric film deposited on the recording film, and
      a reflection film formed on the second dielectric film,
   wherein the recording film has a main composition represented by $(GeTe)_x Sb_{2-y} In_y Te_3$, and its composition ratio is within ranges of $0.04 \leq y < 2$ and $4 \leq x \leq 8$ and
   wherein the thickness of the recording film is equal to or greater than 6 nm and equal to or smaller than 13 nm.

* * * * *